J. ANDERSON.
Truss-Bridges.
No. 136,951. Patented March 18, 1873.
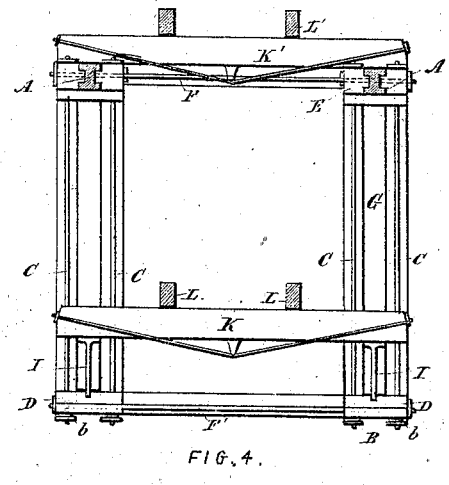
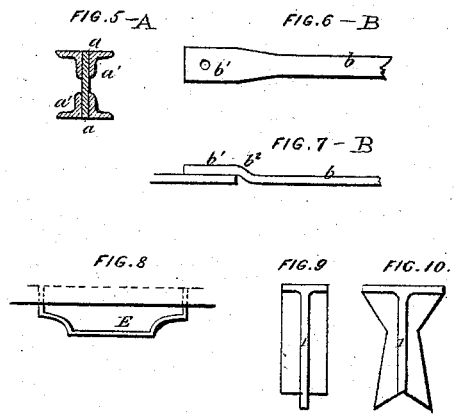
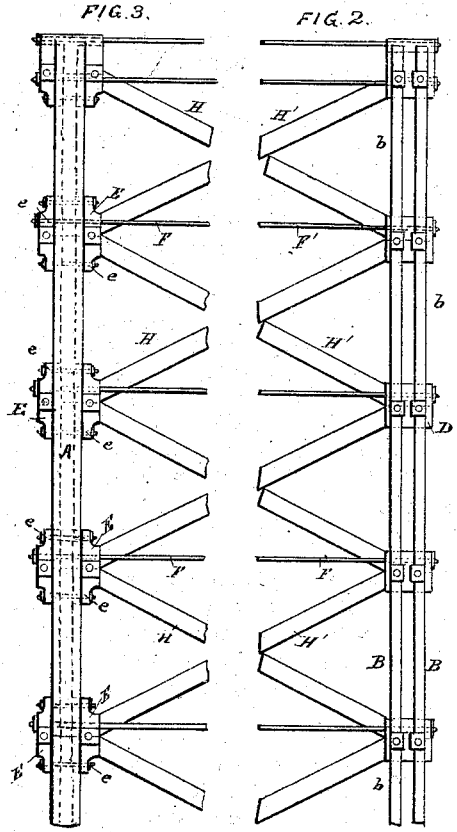
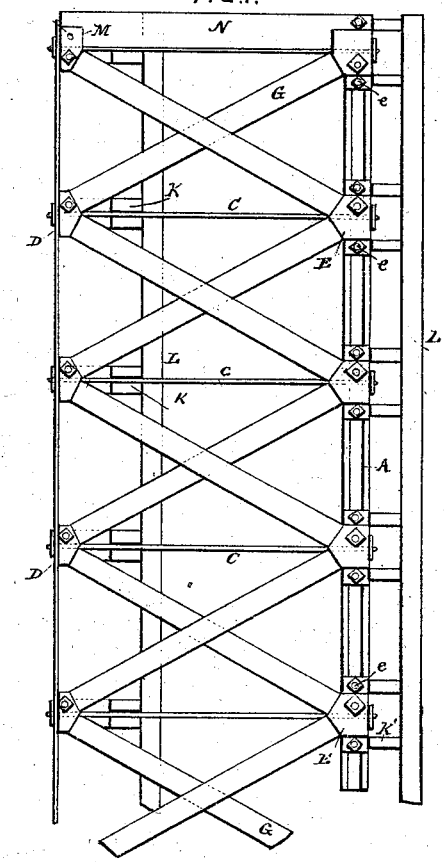
Witnesses
O Dean
Zas Murray
Inventor
James Anderson
AM. PHOTO-LITHOGRAPHIC CO. N.Y (OSBORNE'S PROCESS)

UNITED STATES PATENT OFFICE.

JAMES ANDERSON, OF GOUVERNEUR, NEW YORK.

IMPROVEMENT IN TRUSS BRIDGES.

Specification forming part of Letters Patent No. 136,951, dated March 18, 1873.

*To all whom it may concern:*

Be it known that I, JAMES ANDERSON, of the town of Gouverneur, in the county of St. Lawrence, in the State of New York, have invented new and useful Improvements on the "Howe-Truss" Bridge; and I do hereby declare that the following is a full, clear, and exact description of the same, reference being had to the annexed drawing, where similar letters of reference indicate like parts, and in which—

Figure 1 represents a side view of part of a span of a bridge embodying my invention. Fig. 2 represents a plan of bottom chord of same. Fig. 3 represents a plan of top chord of same. Fig. 4 represents a section of same. Fig. 5 represents a detail of top chord. Fig. 6 represents a detail of bottom chord. Fig. 7 represents a detail of bottom chord. Fig. 8 represents a detail of clamp. Fig. 9 represents a detail of saddle-piece. Fig. 10 represents a detail of saddle-piece.

My invention has reference to improvements on that class of bridges constructed on the principle known as the Howe truss; and has for its object to render structures of that description stronger, more durable, and having the different parts better adapted to perform their respective functions and to resist the strains which they have to bear than those as framed at present.

Letter A is the top chord or compression-beam of the truss in my invention, framed as shown in Fig. 5, and composed of flat iron $a$ and angle-iron $a'$, riveted or otherwise securely fastened together. In Figs. 6 and 7 is shown more particularly the details of the construction of the bottom chord B, which is formed of iron bars $b$, the length of each being preferably that of each bay, the ends being hammered out, as shown at $b^1$ in Fig. 6, and formed with a shoulder, $b^2$, in order to allow of the next bar being securely attached to it, all the bars thus forming one continuous line, being secured together by the side truss-rods C, provided with nuts, &c., as usual, and placed in pairs, which pass through the ends $b^1$ of the bars $b$ and secure them to the prisms D, and these to the clamps E, shown in Figs. 1 and 3, and more in detail in Fig. 8. These are secured to the top chord A, preferably by bolts passing through it and the clamps, and provided with nuts, &c. These clamps E are formed preferably of cast-iron, of some such configuration as that shown, and of the strength of metal required to resist the strains upon them. F F' are the horizontal transverse bolts with nuts, washers, &c., F denoting the bolts for the top chords A, and F' those for the bottom chords B. G G shows the lattice-work or braces between the top and bottom chords, and H H' that horizontal between the chords; but as these present no novel feature no further allusion need be made to them. I are the saddle-pieces, shown most particularly in Figs. 4, 9, and 10, by preference of cast-iron, and of some such configuration as that shown, from their shape resting firmly on the prisms D, and affording a secure seat for the cross-girders K carrying the longitudinal sleepers L, and which may, if desired, be trussed, as shown in Fig. 4. The cross-girders may be carried, if required by the level of the line, on the top chord A, as shown at K', and the longitudinal sleepers L' carried thereon. M is the end prism, formed as a shoe to receive the lower end of the post N, and with an inclined surface for the end of the lattice or brace G to abut against.

Having thus described my invention, what I claim is as follows:

1. The top chords, constructed substantially as described, with the clamps E, in combination with truss-rods C, as described.

2. The combination of the truss-rods C with bars $b$, constructed as described, and forming the bottom chord B.

3. The saddle-pieces I, in combination with prisms D and cross-girders K, substantially as and for the purposes set forth.

4. The combination of top chord A, bottom chord B, clamps E, saddle-pieces I with other parts of framing of a Howe-truss bridge, substantially as and for the purposes set forth.

Gouverneur, 24th day of October, A. D. 1872.

JAMES ANDERSON.

Signed in the presence of—
I. DEAN,
JAS. MURRAY.